Figure 1:
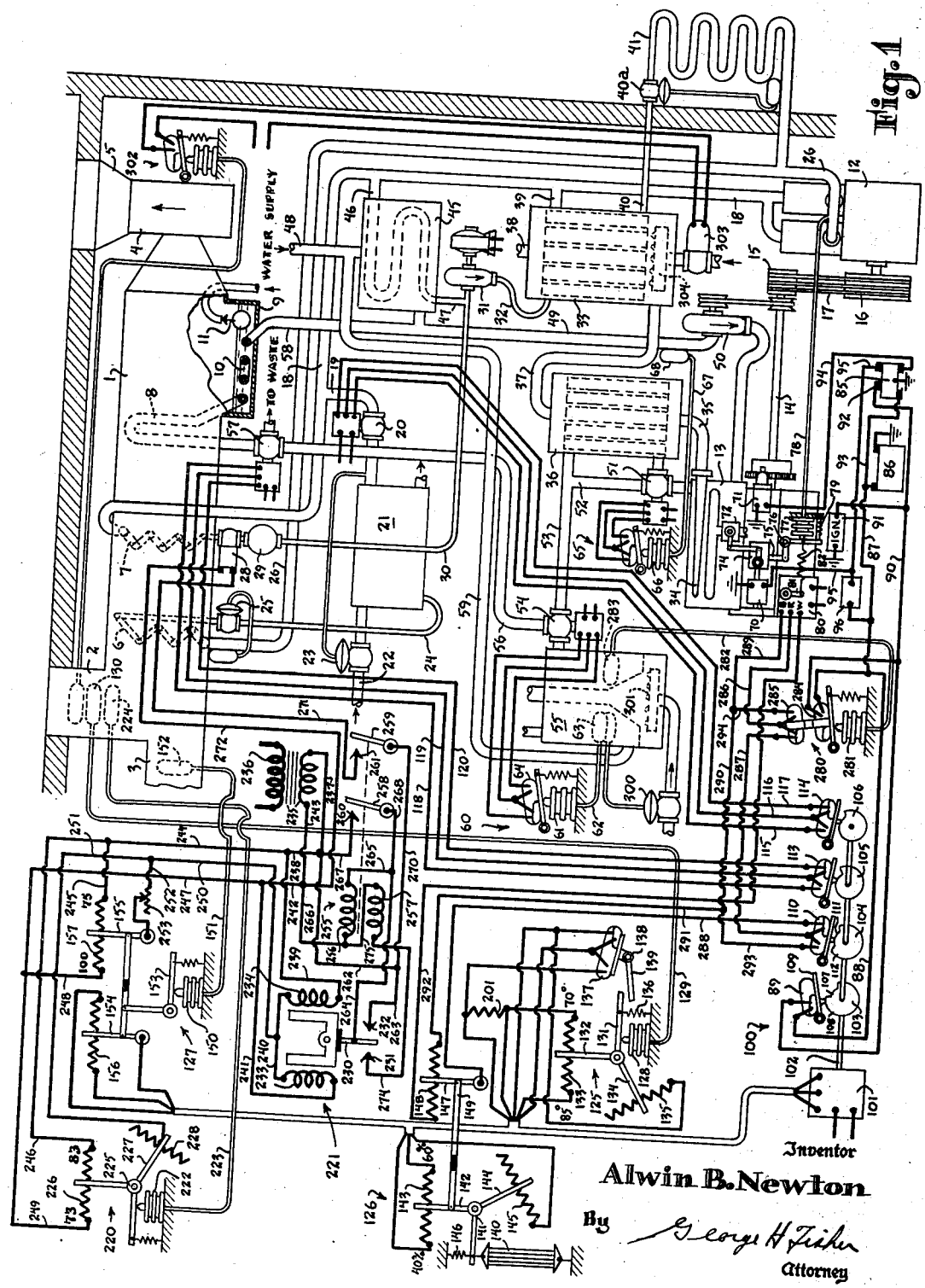

Inventor
Alwin B. Newton
By George H. Fisher
Attorney

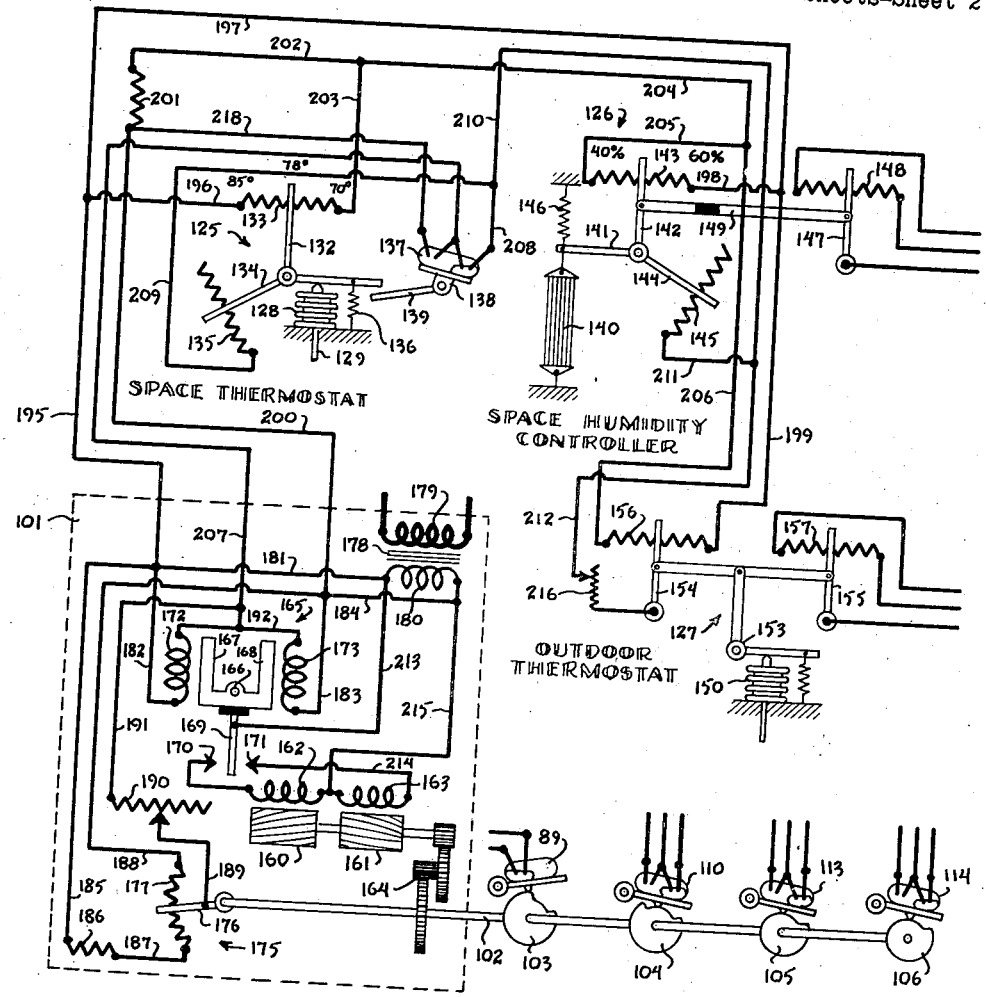

Patented Oct. 28, 1941

2,260,477

UNITED STATES PATENT OFFICE 2,260,477

AIR CONDITIONING SYSTEM

Alwin B. Newton, Minneapolis, Minn., assignor to Minneapolis-Honeywell Regulator Company, Minneapolis, Minn., a corporation of Delaware Application September 24, 1938, Serial No. 231,571

26 Claims. (Cl. 257—3)

This invention relates in general to air conditioning and is more particularly concerned with the provision of automatic controls therefor.

The primary object of this invention is the provision of an air conditioning system which is entirely automatic in operation and which operates to cool and dehumidify the space being conditioned during the summer and to heat the space during the winter.

More specifically, it is an object of this invention to provide an automatic air conditioning system which includes a reversible cycle refrigeration system which operates to cool the space during the summer, to heat the space during the winter, and to provide a supply of domestic hot water at all times.

A further object of this invention is the provision of an air conditioning system of the type utilizing an internal combustion engine for driving a reversible cycle refrigeration system with an automatic control system which controls the engine and the reversible cycle system in a manner to maintain proper temperature conditions in both summer and winter, and to utilize the waste heat from the engine for providing a supply of domestic hot water.

Another object of this invention is the provision of a control system which utilizes waste heat from the engine for heating domestic hot water and which automatically supplies any remaining waste heat to the space when the system is operating on the heating cycle, and which provides for disposing of excess waste heat when the system is operating on the cooling cycle.

Another object is the provision of a reversible cycle refrigeration system for heating a space during the winter, for cooling the space during the summer, and which is operable for simultaneously cooling and heating for providing dehumidification when necessary.

Another object of this invention is the provision of an air conditioning system having a first thermostat for operating the cooling means and a second thermostat for operating a reheater in which the two thermostats are simultaneously adjusted in accordance with outside temperature.

A further object of this invention is the provision of an automatic control system for an air conditioning system utilizing an internal combustion engine driven compressor which acts to place the engine into operation upon rise in either temperature or humidity and which varies the engine speed in accordance with relative humidity when the engine is in operation.

Another object is the provision of a control arrangement which varies the suction pressure maintained within the refrigeration system in accordance with changes in relative humidity within the space being conditioned.

Other objects will become apparent from the following detailed description and the appended claims.

For a full disclosure of my invention reference is made to the following detailed description and to the accompanying drawings, in which Figure 1 indicates diagrammatically a combined summer-winter air conditioning system embodying the features of my invention.

Figure 2 is a wiring diagram for a portion of the control system of Figure 1, and Figure 3 is a diagram for illustrating the action of the arrangement shown in Figure 2.

Referring to Figure 1, reference character 1 indicates an air conditioning chamber having a return air duct 2 and a fresh air duct 3. A fan 4 is connected to this chamber for drawing air therethrough and discharging it through a duct 5 into the space being conditioned. Located within the chamber 1 is a summer evaporator 6 for cooling the air during the summer, and a winter condenser 7 for heating the air during the winter. Also located within chamber 1 is a heating coil 8 and a humidifier 9, this humidifier being of the pan type and having a heating coil 10 which receives heating medium from the coil 8. The humidifier 9 is also provided with suitable float control means indicated at 11 for maintaining a constant water level therein.

Reference character 12 indicates a refrigerant compressor which is driven by an internal combustion engine 13 in any suitable manner, this drive being indicated diagrammatically as including a drive shaft 14 having a pulley 15 which drives the compressor pulley 16 through the medium of belts 17.

Connected to the compressor 12 is a discharge line 18 which leads to the winter condenser 7 for conveying compressed refrigerant from the compressor to this condenser. Also connected to the discharge line 18 is a branch pipe 19 connected to a valve 20 which in turn is connected to a summer condenser 21 which condenses refrigerant when the system is operated for cooling the space. The condenser 21 is provided with a cooling water inlet pipe 22 in which is interposed a pressure actuated control valve 23 which is controlled in accordance with the pressure of the refrigerant being condensed. Upon an increase in the pressure of the refrigerant in condenser 21, valve 23 will open further for increasing the supply of cooling water to the condenser. Conversely, upon a decrease in pressure of the condensing refrigerant, valve 23 will decrease the supply of cooling water. In this manner just the proper amount of cooling water is supplied for condensing the refrigerant. When valve 20 is closed the refrigerant pressure within condenser 21 will drop below the setting of valve 23 which will shut off the supply of cooling medium. The arrangement just described, therefore, operates to supply just the proper amount of cooling water to the condenser when the system is operating on the cooling cycle, and shuts off the supply of cooling water to this condenser when the system is operating on the heating cycle.

The outlet of the condenser 21 is connected by a liquid line 24 to the inlet of the cooling coil 6, an expansion valve 25 being located at the inlet of this cooling coil. This expansion valve may be of any desired type and is indicated as being of the usual thermostatic type. The outlet of cooling coil 6 is connected by a suction line 26 to the inlet of the compressor 12. Thus when the valve 20 is open, compressed refrigerant passes into the condenser 21 and is condensed. The liquid refrigerant then flows through the expansion valve 25 into the cooling coil 6 wherein it evaporates for cooling the air being passed to the conditioned space.

As mentioned before, the compressor 12 is connected by the discharge line 18 to the inlet of the winter condenser 7. The outlet of this condenser is connected to a control valve 28 which may be of the solenoid type. When this valve is closed liquid refrigerant will collect in the convolutions of coil 7 thus preventing the entry of compressed refrigerant into said coil. However, when valve 28 is open, liquid refrigerant will flow from the coil 7 into the receiver 29 thus permitting the entry of compressed refrigerant into the coil 7 for condensing, thereby heating the air passing through the chamber 1. From the condenser 29 the liquid refrigerant passes through pipe 30 into pump 31 and from this pump passes through pipe 32 into an auxiliary evaporator 33. This auxiliary evaporator is heated by exhaust gases from the engine 13. These exhaust gases pass from the exhaust manifold 34 of engine 13 through pipe 35 into heat exchanger 36 and from this heat exchanger pass through pipe 37 into the auxiliary evaporator 33 and leave this evaporator through pipe 38. Due to the liquid refrigerant being heated by the exhaust gases from the engine, a portion of this liquid refrigerant will be re-evaporated and will pass through pipe 39 back into the discharge line 18 and thus flow with the compressed refrigerant from the compressor back into the winter condenser 7. The unevaporated portion of the refrigerant leaves heat exchanger 33 through liquid line 40 and passes through an expansion valve 40a into a winter evaporator 41 which may be located outside or in heat exchange relationship with any suitable source of heat. This winter evaporator 41 is connected to the inlet of the compressor 12.

From the description thus far it should be apparent that when valve 20 is open and valve 28 is closed, the condenser 7 will fill up with liquid refrigerant for placing this condenser out of operation, while refrigerant will flow through summer condenser 21 and summer evaporator 6 for cooling the space. When valve 20 is closed, however, and valve 28 is open, the summer evaporator 6 will be placed out of operation and the winter condenser 7 will operate for heating the space, this condenser receiving its heat from the auxiliary evaporator 33, the outside evaporator 41, and the mechanical work of compression performed by compressor 12. When valves 20 and 28 are both open the cooling coil 6 will function for dehumidifying the space and the condenser 7 will function for providing reheat.

This invention also provides for utilizing the refrigeration system for providing a supply of domestic water or other heated fluid irrespective of whether the system is operating on the heating cycle or the cooling cycle. For this purpose an auxiliary condenser 45 is provided, this condenser being connected by inlet pipe 46 to the discharge line 18 and being connected by a liquid line 47 to the inlet of pump 31. Therefore, the condenser 45 receives compressed refrigerant at all times and discharges the condensed refrigerant to the pump 31 from which it passes through the auxiliary evaporator 33 for re-evaporation, the re-evaporated portion passing back into the compressor discharge line 18.

Reference character 48 indicates a water supply pipe which may be connected to the city water service, this pipe being connected to the inlet of condenser 45. The water outlet of this condenser is connected by pipe 49 to the inlet of pump 50 which may be driven by the engine 13. This pump 50 in turn discharges into the water jacket of engine 13. The outlet of this water jacket is connected to a motorized three-way valve 51 which selectively passes the water through the exhaust gas heated heat exchanger 36 or through a by-pass 52 around this heat exchanger. The outlet of heat exchanger 36 and the by-pass 52 are connected to a pipe 53 which leads to the inlet of a motorized three-way valve 54. This valve has one port connected to the domestic water storage tank 55, and its other port is connected by pipe 56 to the inlet of a motorized three-way valve 57 having one outlet connected to the heating coil 8 in the conditioning chamber 1 and another outlet connected to a suitable waste line. The heating coil 8 discharges through the heating coil 10 located in humidifier 9 and this coil 10 is connected by pipe 58 to the pipe 49. The storage tank 55 is connected also to a pipe 59 which joins the inlet pipe 48 of the condenser 45.

The motorized valve 54 may be controlled by a thermostat 60 which may be of any suitable type. This thermostat is responsive to the temperature of the water in tank 55 and is illustrated as comprising a bellows 61 connected by a capillary tube 62 to a control bulb 63 located within tank 55. This bellows actuates a mercury switch 64 which controls the motorized valve 54. This motorized valve may be of any suitable type and is indicated as being of the usual type utilizing a three-wire control circuit which is connected to the electrodes of the mercury switch 64. When the temperature within tank 55 reaches a predetermined high value, such as 180° F., the bellows 61 of thermostat 60 will cause tilting of mercury switch 64 for bridging its left-hand electrodes as shown, and this will cause the three-way valve 54 to assume a position for stopping the flow of heated water into tank 55. When, however, the temperature within tank 55 falls below the setting of thermostat 60, the valve 54 will be positioned for causing heated water to flow into this tank.

The three-way valve 51 is controlled by means of a thermostat 65 which may be similar to the thermostat 60. This thermostat includes a bellows 66 connected by a capillary tube 67 to a control bulb 68. This control bulb 68 may be responsive to the water temperature in tank 55, or may be responsive to the temperature of the water flowing through pipe 49 as shown. When the water temperature indicates that heating in addition to the jacket heat is required, the thermostat 66 will position the three-way valve 51 for causing the water flowing from the engine water jacket to flow through the exhaust gas heat exchanger 36 for additional heating. However, when the temperature of the water is at a high value indicating that such additional heating is not necessary, the three-way valve 51 will be positioned for by-passing the water around heat exchanger 36.

The three-way valve 57 is controlled in accordance with space temperature in a manner to be hereinafter described. When the space temperature is at a value indicating that heat is required for the space, three-way valve 57 will be positioned for allowing heated water to pass through the heating coil 8. However, when the space temperature is at a value indicating that heat is not necessary for the space, the three-way valve 57 will be positioned for allowing water flowing through pipe 56 to run to waste.

With the control arrangement just described, when heat is required for the domestic water, water will be circulated by the pump 50 from condenser 45 through the engine water jacket through heat exchanger 36 into tank 55 and from tank 55 through pipe 59 back to the inlet of condenser 45. In this manner the domestic water will be heated by the action of compressor 18 and also with the waste heat given up by engine 13 whenever the temperature of the domestic water is lower than the temperature of the condensing refrigerant. When the temperature of the domestic water in tank 55 reaches the maximum desired value, then three-way valve 54 is positioned for passing the heated water to the heat exchanger 8. At this time, if the space requires heating, the three-way valve 57 will be positioned for permitting this heated water to flow through the heat exchanger 8 thus delivering up its heat to the air flowing to the conditioned space. The water discharged from the heating coils 8 and 10 through pipes 58 and 49 will be relatively cool, which will cause the thermostat 66 to maintain three-way valve 51 in a position for passing the water through the exhaust gas heat exchanger 36. Therefore, at this time all of the heat available from engine 13 will be transferred to the space. However, if heat is not required for either the domestic water or for heating the space, the three-way valve 54 will be positioned for passing the heated water through pipe 56 to the three-way valve 57 and this three-way valve will be positioned for allowing the water to run to waste. This position of the three-way valve 57 will allow city water to pass through pipe 48 into condenser 45 and through the engine water jacket for cooling the engine. It will be apparent that whenever water is withdrawn from the storage tank 54, make-up water will be supplied through pipe 48 and will pass through the condenser 45, the engine water jacket and the heat exchanger 36 before reaching the storage tank 55.

Referring now to the internal combustion engine 13, this engine may be of any desired type and may include a generator 70, a starting motor 71 and a throttle valve 72. This throttle valve 72 may be positioned by means of a suitable governor 74 which positions the throttle valve 72 in a manner tending to maintain a constant engine speed. This governor 74 may include an adjusting rod 75 which is actuated by means of a bell crank lever 76 which lever in turn is positioned by means of a bellows 77 connected by tube 78 to the suction side of the compressor. The bell crank lever 76 may be biased against the bellows 77 by means of a spring 79. When the system is operating on the cooling cycle the pressure in suction line 26 will vary with the temperature of cooling coil 6. Thus as the temperature of the air passing across cooling coil 6 increases, more refrigerant will evaporate within coil 6 this causing the temperature of coil 6 and the suction pressure to rise. In response to this rise in pressure the bellows 77 will expand against the action of spring 79 for adjusting governor 74 in a manner to increase the engine speed. This increase in engine speed will tend to maintain the temperature of cooling coil 7 substantially constant. It will be apparent that upon a decrease in suction pressure the bellows 77 will contract for adjusting the governor 74 in a manner to decrease the engine speed.

This invention provides for the changing of the temperature of cooling coil 6 in accordance with variations in relative humidity, and also provides for operating the engine 13 at full speed whenever the system is operating on the heating cycle. In order to obtain these results a proportioning motor 80 is provided having an operating arm 81 connected by a spring 82 to the lever 76. This proportioning motor 80 may be of any desired type and preferably is of the type shown and described in Patent No. 2,028,110 issued to Daniel G. Taylor on January 14, 1936. This motor is adapted to assume intermediate positions under the control of a potentiometer controller. When the operating arm 81 is positioned at its counter-clockwise limit of rotation a minimum tension will be placed on the spring 82. This spring 82 it will be noted acts in the same direction as the bellows 77. Consequently, when the spring 82 is at minimum tension the bellows 77 will act to maintain a predetermined high pressure within the suction side of the refrigeration system. As the arm 81 rotates in a clockwise direction the tension of spring 82 will increase, thus adjusting the bellows 77 for maintaining lower and lower suction pressures. This motor 80 is controlled in accordance with space temperature, relative humidity, and domestic water temperature as will be described hereinafter.

The engine 13 is also provided with an automatic starting arrangement for permitting the engine to be started under automatic control. This automatic starting arrangement may consist of a starting relay 85 which may be of the type shown and described in Patent No. 1,773,913 issued to L. K. Loehr et al. on August 26, 1930.

This type of starting relay is adapted to energize the starting motor as soon as the ignition switch is closed and to deenergize the starting motor when the engine starts. Reference character 86 indicates a storage battery which is connected by wires 87 and 88, mercury switch 89 and wire 90 to the ignition coil 91 of the engine, and to the control terminal 92 of the starting relay 85. The mercury switch 89 operates as an ignition switch for the engine 13. When this switch is closed the ignition circuit for the engine 13 will be energized and also the starting relay 85 will be energized. This will cause the starting relay to complete a circuit from storage battery 86 through wires 93 and 94 to the starting motor 71 for cranking the engine. When the engine starts the decrease in starting current will cause the relay 85 to deenergize the starting motor. Also the terminal voltage built up by operation of the generator 70 will cause the relay 85 to maintain the starting motor 71 deenergized so long as the engine is running. For this purpose the starting relay 85 is connected to the generator 70 by wire 95. A reverse current relay 96 is also connected between the generator 70 and the storage battery 86 in the usual manner. It will be apparent that when the mercury switch 89 is closed, the engine will be placed into operation. When this switch is open, however, the ignition circuit for the engine will be deenergized for stopping the engine, unless a parallel energizing circuit for the ignition system is closed by a domestic water temperature controller which will be described hereinafter.

The mercury switch 89 forms a part of a step controller generally indicated as 100. This step controller comprises a proportioning motor 101 having an operating shaft 102 carrying cams 103, 104, 105, and 106. The cam 103 actuates the mercury switch 89 and is provided with a depressed portion 107 and a raised portion 108. This cam actuates a follower 109 which carries the mercury switch 89. When the cam 103 is positioned so that the follower 109 engages the depressed portion 107, the mercury switch 89 will be tilted to open position. However, if cam 103 is rotated in either direction the raised portion 108 will engage the follower 109 for tilting mercury switch 89 to closed position. The cam 104 actuates a cam follower carrying a mercury switch 110. This cam is provided with a depressed portion 111 and with a raised portion 112. The depressed portion 111 of this cam is larger than the depressed portion of cam 107, this permitting the mercury switch 110 to be tilted for bridging its right-hand electrodes even when the mercury switch 89 is tilted to closed position. If cam 104 is rotated in either direction so as to cause the follower to engage the raised portion 112, the mercury switch 110 will be tilted for bridging its left-hand electrodes. The mercury switch 110 is connected into the control circuit of the proportioning motor 80 in a manner which will be described hereinafter.

The cams 105 and 106 actuate mercury switches 113 and 114 respectively. These cams may be identical and cause tilting of switches 113 and 114 for bridging their right-hand electrodes when the cam followers engage the depressed portions of these cams. When shaft 102 is rotated to its counter-clockwise limit of rotation these cams cause tilting of switches 113 and 114 in the opposite manner. The mercury switch 114 is connected into the control circuit of the motorized valve 20 at the inlet of the summer condenser 21 by means of wires 115, 116, and 117. When the mercury switch 114 is tilted for bridging its right-hand electrodes the valve 20 will be opened, while when switch 114 is tilted in the opposite direction the valve 20 will close. The mercury switch 113 is connected into the control circuit of the motorized three-way valve 57 by means of wires 118, 119, and 120. When this mercury switch is tilted for bridging its right-hand electrodes the three-way valve 57 assumes a position for permitting the water to run to waste, while when switch 113 is tilted in the opposite direction the valve 57 will be positioned for passing water through the heating coil 8.

Referring now to the controls for the proportioning motor 101, this proportioning motor is controlled by the conjoint action of a return air thermostat 125, a space relative humidity controller 126 and an outdoor thermostat 127. Referring to the return air thermostat 125, this thermostat may include a bellows 128 which is connected by a capillary tube 129 to a control bulb 130 located in the return air duct 2. This bellows actuates a lever arm 131 which carries a slider 132 cooperating with a resistance 133 and also carries a slider 134 which cooperates with a resistance 135. The bellows, tube and bulb are charged with a suitable volatile fill for causing the pressure within bellows 128 to vary with changes in return air temperature. As the space temperature increases, the bellows 128 will expand for rotating lever 131 against the action of spring 136, thus rotating sliders 132 and 134 in a counter-clockwise direction across their respective resistances. Upon a decrease in return air temperature the bellows 128 will contact for causing movement of the sliders 132 and 134 in the opposite direction. This instrument may be so designed and adjusted as to cause the slider 132 to engage the left-hand end of resistance 133 when the space temperature is at or above 85° F. while engaging the right-hand end of resistance 133 when the space temperature falls to 70° F. The thermostat 125 also includes an auxiliary switch 137 which is diagrammatically illustrated as comprising a mercury switch carried by a pivoted switch carrier 138 having an arm 139 adapted for engagement with the lever arm 131. This arrangement is such as to cause switch 137 to be tilted for bridging its right-hand electrodes when the space temperature is above 70° F. However, when the space temperature falls to 70° F. the lever 131 engages arm 139 for tilting mercury switch 137 to bridge its left-hand electrodes.

Referring to the space relative humidity controller, this controller is diagrammatically illustrated as comprising a humidity responsive device 140 which may comprise a plurality of strands of hair or other moisture responsive material. This humidity responsive device is connected to a lever arm 141 which carries a slider 142 which cooperates with a resistance 143, and a slider 144 which cooperates with a resistance 145. A spring 146 acts to urge lever 141 in a direction for maintaining the strands of the device 140 taut. This humidity controller 126 may also include a slider 147 which cooperates with a resistance 148. This slider is actuated in unison with the slider 142 in any suitable manner such as by an insulated connection 149. Upon an increase in space relative humidity, the strands of the device 140 will increase in length for permitting clockwise rotation of the sliders 142, 144 and 147 across their respective resistances. Upon a decrease in relative humidity, the strands of the device 40 will shrink for causing rotation of the sliders in the opposite direction. This instrument may be so designed and adjusted as to cause the slider 142 to engage the left-hand end of resistance 143 when the space relative humidity is at 40% while engaging the right-hand end of said resistance when the relative humidity is at 60%.

Referring to the outside temperature responsive thermostat 127, this thermostat may include a bellows 150 which is connected by a capillary tube 151 with a control bulb 152 located in the fresh air duct 3. This bellows 150 may actuate a bell crank lever 153 which through a suitable linkage actuates sliders 154 and 155. The slider 154 engages a resistance 156 to form a control potentiometer for motor 101, and the slider 155 engages a resistance 157 for forming a second control potentiometer. This instrument may be so designed and adjusted as to cause the sliders to engage the left-hand ends of their resistances when outside temperature is at 100° F., while causing said sliders to engage the right-hand ends of their resistances when outside temperature falls to 75° F.

Referring now to Figure 2, this figure indicates the interior wiring of the proportioning motor 101 and also indicates the connections between this motor and the controllers 125, 126 and 127. Referring to the proportioning motor 101, this motor may consist of a pair of rotors 160 and 161 which cooperate with field coils 162 and 163. The rotors 160 and 161 are mounted upon the same shaft and drive the operating shaft 102 through a gear train 164. The rotor 160 and field coil 162 form a motor for driving the shaft 102 in one direction, and the rotor 161 and field coil 163 form a motor for driving the shaft 102 in the opposite direction.

Energization of the field coils 162 and 163 is controlled by means of a balancing relay 165. This relay may consist of a U-shaped armature which is pivoted at 166 and which has legs 167 and 168. This armature carries a switch arm 169 which cooperates with contacts 170 and 171. The legs 167 and 168 of the U-shaped armature cooperate with relay coils 172 and 173 respectively. When the relay coils 172 and 173 are equally energized the armature will assume the position shown in which the switch arm 169 is disengaged from contact 170 and contact 171. If relay coil 172 becomes more highly energized than coil 173 the armature will rotate in a clockwise direction for causing switch arm 169 to engage contact 170. If relay coil 173 becomes more highly energized than coil 172, switch arm 169 will engage contact 171.

Reference character 175 indicates a balancing potentiometer which may consist of a slider 176 which is operated with the operating shaft 102 of the proportioning motor. This slider 176 cooperates with a resistance 177. Reference character 178 indicates a step-down transformer having a primary 179 and a secondary 180. The relay coils 172 and 173 are connected in series across the transformer secondary 180 by means of wires 181, 182, 183 and 184. This causes current to flow through these relay coils. The balancing resistance 177 is also connected across the transformer secondary by means of wires 181, 185, resistance 186, wire 187, wire 188 and wire 184. The slider 176 of the balancing potentiometer is connected by wire 189, rheostat 190 and wire 191 to a wire 192 which joins the upper ends of the coils 172 and 173. By this arrangement the slider 176 divides the resistance 177 into a portion which is in parallel with relay coil 172, and another portion which is connected in parallel with relay coil 173. For example, the portion of resistance 177 between slider 176 and the upper end of said resistance is connected in parallel with relay coil 173 as follows: from lower end of coil 173, wire 183, wire 188, upper portion of resistance 177, slider 176, wire 189, rheostat 190, wire 191 and wire 192 to the upper end of coil 173. In a similar manner the lower portion of resistance 177 is connected in parallel with relay coil 172. It will be apparent that movement of slider 176 on resistance 177 will vary the portions of resistance 177 connected in parallel with relay coils 172 and 173 and will thus vary the relative energizations of these coils.

The controllers 125, 126, and 127 also vary the relative energizations of relay coils 172 and 173 in a manner similar to the action of the balancing potentiometer 175. It will be noted that the lower end of relay coil 172 is connected by wires 182, 195, 196, 197, 198, and 199 to the left-hand end of resistance 133 to the right-hand end of resistance 143 and to the right-hand end of resistance 156 respectively. Also the lower end of relay coil 173 is connected by wires 183 and 200, resistance 201 and wires 202, 203, 204, 205, and 206 with the right-hand end of resistance 133, the left-hand end of resistance 143 and the left-hand end of resistance 156 respectively. The resistances 133, 143, and 156 are therefore connected in parallel with the parallel connected relay coils 172 and 173. Also the upper ends of these relay coils are connected by wire 192, wire 207, mercury switch 137, wire 208 and wire 209 to the resistance 135 of the thermostat 120. Due to the slider 134 engaging this resistance 135, the slider 132 of this controller is thus connected to the upper ends of the relay coils 172 and 173. This causes the slider 132 to divide the resistance 133 into one portion which is in parallel with relay coil 172 and into a second portion which is connected in parallel with the relay coil 173. The wire 208 is also connected by wires 210, 211 and 212 to the resistance 145 of the humidity controller 126 and to the slider 154 of the outdoor thermostat 127 respectively. This causes the sliders 142 and 154 of these controllers to divide their respective resistances into portions in parallel with each relay coil.

With the controllers 125, 126, and 127 in the positions shown wherein each slider is engaging the center of its associated resistance, the amount of resistance connected in parallel with each relay coil is equal. This causes the operating shaft 102 to assume mid-position in which the slider 176 of the balancing potentiometer engages the center of resistance 177. If the space temperature should increase, the slider 132 of thermostat 125 will move to the left across resistance 133, this action decreasing the portion of resistance 133 which is in parallel with relay coil 172 and increasing the portion of this resistance which is in parallel with coil 173. This will decrease the current flow in relay coil 172 while increasing the current flow in relay coil 173, thus causing switch arm 169 to engage contact 171. This will complete a circuit from transformer secondary 180, wire 213, switch arm 169, contact 171, wire 214, motor field coil 163 and wire 215 to transformer secondary 180. Energization of coil 163 will cause rotation of operating shaft 102 in a clockwise direction, this causing the slider 176 to move upwardly on balancing resistance 177. This upward movement of slider 176 on resistance 177 will decrease the portion of this resistance which is connected in parallel with relay coil 173 while increasing the portion of said resistance which is in parallel with coil 172, this action tending to balance out the initial unbalancing action of the thermostat 125. When shaft 102 rotates sufficiently for causing balancing out of this initial unbalancing action, the relay coils 172 and 173 will become equally energized, and switch arm 169 will disengage contact 171 for stopping the shaft 102 in this new position. Conversely, upon a decrease in space temperature the slider 132 will move to the right across resistance 133 thus increasing the energization of relay coil 172 and decreasing the energization of coil 173. This will cause switch arm 169 to engage contact 170 for energizing motor field coil 162, this causing rotation of the shaft 102 in a counter-clockwise direction. When the shaft rotates an amount proportionate to the movement of slider 132, the balancing potentiometer 175 will rebalance the relay 165 for stopping the shaft 102 at this new position. It should therefore be seen that as the space temperature increases, the shaft 102 will rotate in a clockwise direction while when the space temperature decreases the shaft 102 will rotate in a counter-clockwise direction.

If the space relative humidity increases, the slider 142 of the humidity controller 136 will move to the right across resistance 143 thus decreasing the portion of this resistance which is in parallel with relay coil 172 while increasing the portion of this resistance which is in parallel with coil 173. This will increase the energization of coil 173 and decrease the energization of coil 172 for causing the switch arm 169 to engage contact 171, this in turn causing rotation of shaft 102 in a clockwise direction. When the shaft 102 rotates an amount proportionate to the movement of slider 142 on resistance 143, the balancing potentiometer 175 will rebalance the relay 165 for stopping the shaft 102 in this new position. Conversely, upon decrease in space relative humidity, the slider 142 will move to the left across resistance 143 for causing the shaft 102 to rotate in a counter-clockwise direction to a new position.

From the foregoing description it should be apparent that the space humidity controller 126 acts in the same manner upon the proportioning motor 101 as the space thermostat 125. The shaft 102 of the proportioning motor 101 therefore assumes a position depending upon the resultant action of the space thermostat and space humidity controller. This causes the shaft 102 to be positioned in accordance with the effective temperature within the space.

It should be noted that as the space temperature decreases and slider 132 moves to the right across resistance 133, the slider 134 moves upwardly across resistance 135 thus inserting an additional portion of this resistance into circuit with the slider 132. This decreases the current flow through slider 132 and consequently decreases the effect of thermostat 125 upon the relay coils 172 and 173. Thus after the thermostat 125 becomes satisfied, this thermostat operates automatically to place itself out of control of the proportioning motor 101 for thereby placing this motor under the control of the space humidity controller 126. It should also be noted that as the space relative humidity decreases, the slider 144 of controller 126 moves upwardly across resistance 145 thus inserting an additional portion of this resistance in circuit with slider 142 for decreasing the effect of controller 126 on the motor 101. This action causes the humidity controller 126 to place itself out of control of the motor 101 as the space relative humidity decreases. Due to this action the space thermostat is placed in substantially full control of the proportioning motor 101 when the space relative humidity is low. Thus with the system just described the space thermostat 125 and the humidity controller 126 cooperate to position shaft 102 graduatingly in accordance with the effective temperature within the space when the space temperature and relative humidity are at intermediate values. However, when the space temperature is low, the space thermostat places the humidity controller in substantially full control of the motor 101 for permitting the humidity controller to start the engine 13 in the event that space relative humidity becomes excessive. Also when the space relative humidity is low the humidity controller 126 transfers control of the motor 101 to the space thermostat for permitting this space thermostat to start the engine 13 in the event that space temperature becomes excessive.

If outside temperature should increase, the slider 154 of thermostat 127 will move to the left across resistance 156 for decreasing the portion of this resistance which is connected in parallel with relay coil 173 for increasing the portion of this resistance which is connected in parallel with relay coil 172. This will cause relay coil 172 to become more highly energized than coil 173 thus causing switch arm 169 to engage contact 170 for rotating shaft 102 in a counter-clockwise direction. When shaft 102 rotates in this direction an amount proportionate to the increase in outside temperature the balancing potentiometer 175 will rebalance relay 165 and deenergize the motor in this new position. It should be noted that this action is opposite to the action of the thermostat 125 and the humidity controller 126. Thus before the shaft 102 will be restored to its original position the effective temperature within the space must rise for causing the controllers 125 and 126 to restore the shaft 102 to such position. Thus an increase in outside temperature in effect adjusts the controllers 125 and 126 for increasing the standard of effective temperature maintained within the space. By adjusting the rheostat 216 which is in circuit with the slider 154 of thermostat 127, the effect of this thermostat upon the space temperature may be varied as desired for maintaining the effective temperature maintained within the space within the comfort zone.

It should be noted that when the space temperature is above 70° F., thus causing the mercury switch 137 of controller 125 to assume the position shown, the resistance 201 is connected between relay coil 173 and the resistances of controllers 125, 126 and 127. This resistance prevents complete short-circuiting of the relay coil 173 by any of the controllers 125, 126 or 127. Due to this resistance being in circuit with the coil 173, the balancing arm 176 of the balancing potentiometer 175 will never have to engage the extreme lower end of balancing resistance 177 for balancing the relay 165. This resistance 201 therefore prevents the controllers 125, 126 and 127 from causing the proportioning motor 101 to rotate to its extreme counter-clockwise limit of rotation. This prevents the raised portions of cams 105 and 106 from engaging their respective cam followers for tilting mercury switches 113 and 114 for bridging their left-hand electrodes. This also prevents the corresponding raised portions of cams 103 and 104 from engaging their respective cam followers for tilting mercury switches 89 and 110 in this manner. The mercury switches 113 and 114, it will be remembered, control the valves 57 and 20 and thus in part provide for reversing the action of the system from cooling to heating. Therefore, as long as the space temperature is above 70° and the mercury switch 137 is in the position shown, the resistance 201 will prevent proportioning motor 101 from assuming a position which causes the operation of the system to be reversed from cooling to heating.

However, when space temperature falls to a value sufficiently low for tilting mercury switch 137 for bridging its left-hand electrodes, the sliders of controllers 125, 126 and 127 will be disconnected from the motor 101 and a short-circuit for relay coil 173 will be established as follows: from the lower end of coil 173, wire 183, wire 200, wire 218, left-hand electrodes of mercury switch 137, wire 207, and wire 192 to upper end of coil 173. Due to this short-circuiting of coil 173, the switch arm 69 will engage contact 170 for causing rotation of shaft 102 in a counter-clockwise direction. At this time the relay 165 will not become rebalanced until the slider 176 of the balancing potentiometer engages the lower end of the balancing resistance which is the extreme counter-clockwise limit of rotation of the motor 102. Thus when the space temperature falls to the predetermined low value where heating is required, the space thermostat 125 will cause rotation of the proportioning motor 101 to its extreme counter-clockwise limit of rotation, which causes tilting of switches 89, 110, 113 and 114 for bridging their left-hand electrodes.

Referring to Figure 3, this figure shows a portion of the wiring diagram of Figure 2 in a simplified manner for illustrating the purpose of the resistance 186 which is connected to the lower end of the balancing resistance 177. When the thermostat 125 assumes its extreme low temperature position in which the slider 132 engages the right-hand end of resistance 133, and the slider 134 engages the upper end of resistance 135, the resistance 135 will be connected across relay coil 173 as follows: wire a, wire b, resistance 135, slider 134, slider 132, wire c and wire d to coil 173. Also at this time resistances 135 and 133 will be connected in series across coil 172 as follows: from coil 172, wire a, wire b, resistance 135, slider 134, slider 132, resistance 133, wire e, wire f and wire g to coil 172. Thus it will be noted that when controller 125 assumes the position shown, the coil 173 will not be short-circuited, but instead the resistance 135 will be shunted across this coil. As the resistances 133 and 135 are connected in series across the coil 172 the relationship of resistances connected across coils 172 and 173 is two to one. This would cause the slider 176 of the balancing potentiometer 175 to assume the dotted line position in which the balancing resistance 177 is divided in similar two-to-one relationship for rebalancing the relay 165. This would cause the motor to operate only through two-thirds of its range of movement instead of its total range. By inserting the resistance 186 which is of a value half that of resistance 177 in circuit with the resistance 177, the resistance 186 in effect forms a part of the balancing potentiometer. This resistance causes the two-to-one balancing relationship to occur when the slider 176 reaches its full line position, thus permitting the motor to rotate through its complete range of movement.

Referring now to the control of the solenoid valve 28 and condenser 7, this valve is controlled by means of a space temperature controller 220 and the outside temperature controller 127 through a relay 221. The space temperature controller 220 may include a bellows 222 which is connected by a capillary tube 223 to a control bulb 224 located in the return air duct 2. This bellows 222 actuates a first slider 225 which cooperates with a resistance 226 and a second slider 227 which cooperates with a center tapped resistance 228. This instrument may be so designed and adjusted as to cause the slider 225 to engage the right-hand end of resistance 226 when space temperature rises to 83° or above, while engaging the left-hand end of said resistance when the space temperature falls to 73° F.

Referring to the relay 221, this relay is similar to the balancing relay 165 of the proportioning motor 101. This relay includes a U-shaped armature carrying a switch arm 230 cooperating with contacts 231 and 232. This relay also includes coils 233 and 234 which are connected in series across the secondary 235 of a step-down transformer 236 by means of wires 237, 238, 239, 240, 241, 242 and 243. The lower end of relay coil 234 is connected by wires 239, 244, 245 and 246 with the right-hand end of resistance 157 of thermostat 127 and with the right-hand end of resistance 226 of thermostat 220. Also the lower end of coil 233 is connected by wires 241, 247, 248 and 249 with the left-hand end of resistance 157 and with the left-hand end of resistance 226. The resistances 157 and 226 are therefore connected in parallel with the parallel connected relay coils 233 and 234. The upper ends of relay coils 233 and 234 are connected together by the wire 240 and this wire is connected by wires 250 and 251 to the center of the resistance 228 of the return air thermostat 220. This connects the slider 225 with the connected ends of relay coils 233 and 234 and thus causes this slider to divide resistance 226 into one portion which is connected in parallel with coil 233 and another portion which is connected in parallel with coil 234. The wire 250 is also connected by a wire 252 and rheostat 253 to the slider 155 of thermostat 127 for causing this slider to divide its resistance into portions in parallel with each relay coil.

The relay 221 is adapted to control a second relay 255 which consists of a pair of oppositely connected coils 256 and 257 which cooperate with an armature for actuating switch arms 258 and 259 cooperating with contacts 260 and 261 respectively. This relay 255 controls the valve 28.

With the sliders 155 and 225 in the positions shown, the outdoor temperature is approximately 88° F. while the space temperature is approximately 78° F. Due to these sliders engaging the center of their respective resistances the relay coils 233 and 234 are energized equally, thus causing the switch arm 230 to be disengaged from contact 231 and contact 232. If the space temperature should fall due for instance to operation of the cooling coil 6 under the control of the humidity controller, the slider 225 will move to the left across resistance 226 for decreasing the portion of resistance 226 which is connected in parallel with relay coil 233. This will decrease the energization of coil 233 while increasing the energization of relay coil 234, thus causing the relay armature to rotate for bringing switch arm 230 into engagement with contact 232. This will complete a circuit from transformer secondary 235, wire 237, wire 262, wire 263, contact 232, switch arm 230, wire 264, wire 265, relay coil 256, wire 266 and wire 243 to secondary 235. Energization of relay coil 256 will cause switch arms 258 and 259 to engage their respective contacts. Engagement of switch arm 258 with contact 260 will complete a holding circuit for maintaining the relay coil 256 energized, which is as follows: from secondary 235, wire 237, wire 267, switch arm 258, wire 268, wire 265, relay coil 256, wire 266 and wire 243 to secondary 235. Engagement of the switch arm 259 with contact 261 will complete an energizing circuit for the valve 28 as follows: from secondary 235, wire 237, wire 262, wire 270, switch arm 259, contact 261, wire 271, valve 28, wire 272 and wire 243 to secondary 235. This will open the valve 28 for permitting refrigerant to flow from the condenser 7, thus allowing a portion of this condenser to receive compressed refrigerant and thereby heating the air leaving cooling coil 6. This heating action will cause the space temperature to begin rising and in response to this rise in space temperature the slider 225 of thermostat 220 will move to the right across resistance 226. This will decrease the amount of resistance 226 which is in parallel with coil 234 and increase the amount which is in parallel with relay coil 233. This action will cause clockwise rotation of the relay armature and disengaging of switch arm 230 from contact 232. At this time the relay 255 will remain energized due to the holding circuit through switch arm 258 and contact 260. Upon further increase in space temperature the relay armature will rotate sufficiently for bringing switch arm 230 into engagement with contact 231. This will complete an energizing circuit for relay coil 257 as follows: from secondary 235, wire 237, wire 267, contact 260, switch arm 258, wire 268, wire 264, switch arm 230, contact 231, wire 274, relay coil 257, wire 275, wire 266 and wire 243 to secondary 235. Energization of relay coil 257 will create a magnetic flux which is opposite to the flux produced by coil 255, thus neutralizing the effect of coil 255 and permitting switch arms 258 and 259 to drop away from contacts 260 and 261. Disengagement of switch arm 258 from contact 260 will break the energizing circuit for both relay coils and consequently the relay will remain deenergized. Disengagement of switch arm 259 from contact 261 will deenergize the solenoid valve 28 for permitting this valve to close and stop further flow of refrigerant from coil 7.

It will be noted that the action of outside thermostat 127 on relay 220 is opposite to that of space thermostat 220. Thus upon a fall in outside temperature the switch arm 155 will move to the right across resistance 157 which decreases the energization of relay coil 234 and increases the energization of relay coil 233. This will cause the relay armature to rotate in a clockwise direction tending to bring switch arm 230 into engagement with contact 231. Thus after such drop in outside temperature, the space temperature must fall to a lower value before the space thermostat 220 will increase the energization of coil 234 over that of coil 233 sufficiently to cause the switch arm 230 to engage contact 232. The outdoor thermostat 127 therefore has the effect of lowering the control point of thermostat 220 upon decrease in outside temperature. In other words, when outside temperature is relatively high the reheater will be placed into operation at a higher space temperature than would occur if the outside temperature were lower. By adjusting the rheostat 253 which is connected into circuit with the slider 155 of thermostat 127, the effect of this thermostat upon the control point of thermostat 220 may be varied as desired. It is important, however, that the setting of thermostat 220 for any given outside temperature be lower than the setting of the thermostat 125 in order to prevent the reheater from being placed in operation when the thermostat 125 is operating the system for cooling the space.

Due to the outside thermostat 127 simultaneously adjusting the reheater thermostat 220 and the cooling thermostat 125, these thermostats will cooperate to vary the inside temperature maintained in accordance with variations in outdoor temperature regardless of whether heating or cooling is required for maintaining the desired indoor temperature.

It is a feature of this invention to control the proportioning motor 80 which adjusts the engine governor in accordance with variations in relative humidity when the system is operating on the cooling cycle. It is also a feature of this invention to cause the engine to operate at full speed when the system is operating on the heating cycle and also when the system is operating to satisfy the requirements for domestic hot water. The controls for the motor 80 will now be described. Reference character 280 indicates a thermostat for starting engine 13 and for operating this engine at high speed when the domestic water temperature falls to a predetermined low value. This thermostat may consist of a bellows 281 which is connected by a capillary tube 282 to the control bulb 283 located in tank 55. This bellows actuates a switch carrier which carries mercury switches 284 and 285. When the domestic water temperature is above a predetermined value, such as 150° F., the bellows 281 will assume the position shown. However, when the domestic water temperature falls below this value bellows 281 will contract for tilting mercury switches 284 and 285 in the opposite direction. The mercury switch 284 is connected in parallel with mercury switch 89 in the engine ignition circuit for starting the engine. Thus closure of this switch will cause starting of the engine if the engine is not already operating due to mercury switch 89 being closed. Mercury switch 285 is connected into the control circuit of proportioning motor 80.

Referring now to the control circuit of proportioning motor 80, this motor is provided with three control terminals indicated as R, W and B. This motor in construction is similar to the proportioning motor 101 which has already been described in detail. When the resistance between terminals R and W is decreased, without corresponding decrease in resistance between terminals R and B, motor 80 will run in a direction for decreasing the tension on spring 82 which has the effect of causing the suction pressure controller to maintain a higher suction pressure within the refrigeration system. When the resistance between terminals R and B is decreased without corresponding decrease in resistance between terminals R and W, motor 80 will run in a direction for increasing the tension of spring 82 which tends to increase the engine speed and lower the value of suction pressure maintained within the refrigeration system. Terminal R of motor 80 is connected by wire 286 to the common terminal of mercury switch 285. The left-hand electrode of mercury switch 285 is connected by wire 287 to the common terminal of mercury switch 110, and the right-hand electrode of mercury switch 110 is connected by wire 288 to the slider 147 of humidity controller 126. Therefore, when mercury switches 110 and 285 are in the positions shown, terminal R of motor 80 is connected to the slider 149 of the humidity controller. Terminal B of motor 80 is connected by wires 289, 290 and 291 to the right-hand end of resistance 148 of humidity controller 126, and the left-hand end of this resistance is connected by wire 292 to terminal W of motor 80. Therefore, with mercury switches 110 and 285 in the positions shown, the potentiometer formed of slider 147 and resistance 148 of the humidity controller 126 is in complete control of motor 80. If the space relative humidity increases, the slider 147 of controller 126 will move to the right across resistance 148 which decreases the portion of this resistance which is connected between terminals R and B of motor 80, thus causing this motor to increase the tension of spring 82. This increase in tension of spring 82 will cause adjustment of the governor 74 of engine 13 in a manner to increase the engine speed. This increase in engine speed will cause the temperature of the summer cooling coil 6 to be lowered for thereby increasing the amount of dehumidification performed by this coil. The bellows 77 will then act to control governor 74 to maintain this lower value of suction pressure. If the space relative humidity should decrease, the humidity controller 126 will cause movement of motor 80 for decreasing the tension of spring 82 which causes the engine speed to be lowered for maintaining a higher value of suction pressure within the system, which causes the temperature of cooling coil 6 to be raised thus decreasing the amount of dehumidification performed. The humidity controller 126 therefore has the effect of decreasing the temperature of cooling coil 6 upon increase in relative humidity while increasing the cooling coil temperature upon decrease in relative humidity.

When mercury switch 110 is tilted for bridging its left-hand electrodes due to rotation of the cam 104, the right-hand electrodes will become unbridged for breaking the circuit between the terminal R of motor 80 and the slider 147 of humidity controller 126. The bridging of the left-hand electrodes will complete a circuit from terminal R through the left-hand electrodes of mercury switch 285 and wire 287 through the left-hand electrodes of switch 110 and wires 293, 290, and 289 to terminal B of motor 80. This will cause motor 80 to run to an extreme position for increasing the tension of spring 82 to a maximum thus causing the governor 74 to be adjusted for operating engine 13 at full speed. Therefore, when mercury switch 110 is in the position shown, it tends to place the motor 80 under the control of the humidity controller while when this switch is tilted to its opposite position, it causes motor 80 to run to a position for increasing the engine speed to a maximum irrespective of the value of relative humidity. In the event that the domestic water temperature falls below the setting of thermostat 280 the mercury switch 285 will be tilted for bridging its right-hand electrodes. This will break the circuit from terminal R of motor 80 to the slider 147 of controller 126, and will also complete a short-circuit from terminal R through wire 286, right-hand electrodes of mercury switch 285, wire 294 and wire 289 to terminal B of motor 80, this causing motor 80 to increase the tension of spring 82 to a maximum for operating the engine at full speed. The mercury switches 110 and 285 are thus connected in parallel relation into the control circuit of proportioning motor 80, and either switch is capable of causing motor 80 to be positioned for operating engine 13 at full speed.

*Operation*

With the parts in the positions shown, the space temperature is approximately 78° F. as indicated by the sliders 132 and 225 of thermostats 125 and 220 engaging the centers of their respective resistances. Also, outside temperature is approximately 88° F. as indicated by the sliders 154 and 155 of the outside thermostat 127 engaging the centers of their respective resistances. For these values of space and outside temperatures, the relay 255 in control of solenoid valve 28 is deenergized by the conjoint action of thermostats 220 and 127. The solenoid valve 28 is therefore closed for causing liquid refrigerant to accumulate in the condenser 7 for placing this condenser out of operation.

The space relative humidity at this time is approximately 50% as indicated by the sliders 142 and 147 of the humidity controller 126 engaging the centers of their respective resistances. For these values of space temperature, space relative humidity and outside temperature, the controllers 125, 126, and 127 have caused the proportioning motor to rotate sufficiently to cause cam 108 of step controller 100 to tilt mercury switch 89 to closed position. At this time the auxiliary switch 137 of the thermostat 125 is positioned for cutting resistance 201 into the control circuit of motor 101 for preventing this motor from rotating shaft 102 to its counter-clockwise limit of rotation. Due to closure of the switch 89 of step controller 100, the starting and ignition circuit for the engine is completed, which causes engine 13 to be in operation. For the position indicated of step controller shaft 102, the mercury switch 114 is tilted for bridging its right-hand electrodes, which causes the motorized valve 20 to open for permitting flow of compressed refrigerant into the condenser 21. Therefore, at this time the flow of refrigerant in the refrigeration system is from the compressor 12 through pipes 18 and 19 into condenser 21 and from there through the cooling coil 6 and through pipe 26 to the compressor 12. The cooling coil 6 is therefore in operation for cooling and dehumidifying the air in the space being conditioned. At this time the flow of cooling water through the condenser 21 is graduatingly controlled by the pressure actuated valve 23 in a manner to supply just enough cooling water to maintain the head pressure in the refrigeration system at a predetermined value. Also with shaft 102 of the step controller in the position shown, the mercury switch 113 is tilted for bridging its right-hand electrodes which causes the motorized valve 57 to be positioned for preventing flow of heated water into the cooling coil 8 and for allowing water to run to waste. At this time the domestic water temperature is above the settings of both the thermostat 60 and the thermostat 280. The thermostat 60 has therefore caused the three-way valve 54 to be positioned for preventing entrance of hot water into tank 55. Also at this time the temperature of the water flowing in pipe 49 is above the setting of thermostat 65 which causes the thermostat 65 to position three-way valve 51 for by-passing heated water around the heat exchanger 36. Consequently water from the water supply passes through pipe 48 and the auxiliary condenser 45 for aiding in condensing the compressed refrigerant. This water then passes through pipe 49 and pump 50 through the engine water jacket for cooling the engine, and then passes through pipes 52 and 53 through three-way valve 54 and pipe 60 through valve 57 to waste. The engine is therefore being cooled by supply of water at 48 and wasting of water by the valve 57.

Due to the domestic water temperature being above the setting of thermostat 280, the mercury switch 285 of this thermostat is positioned for placing control of proportioning motor 80 under the humidity controller 126. Due to mercury switch 110 being in the position shown, the control circuit between motor 80 and the humidity controller 126 is completed and consequently the proportioning motor 80 is under the control of controller 126. This controller will vary the engine speed in accordance with variations in space relative humidity so as to maintain lower suction pressures in the refrigeration system as the humidity increases. Thus if the relative humidity increases, this controller will cause the throttle valve motor 80 to increase the tension of spring 82 for maintaining a lower value of suction pressure within the refrigeration system which in turn results in increasing the amount of dehumidification performed by cooling coil 6. A decrease in relative humidity causes the opposite action to occur.

In the event of relatively dry hot weather, the relative humidity may become so low as to cause operation of the engine to maintain a high value of suction pressure which is insufficient to provide the necessary amount of cooling. This will cause the space temperature to rise. In response to this rise in space temperature the thermostat 125 will cause the proportioning motor 101 of the step controller 100 to rotate in a clockwise direction, which will cause the raised portion 112 of cam 104 to tilt the mercury switch 110 for bridging its left-hand electrodes. This will cause proportioning motor 80 to run to a position for increasing the tension of spring 82 to a maximum thus causing operation of the engine at full speed to maintain a low suction pressure within the system. It should therefore be seen that during normal weather conditions the the humidity controller 126 will be in control of the engine 13 and will vary the speed of this engine in a manner to maintain different values of suction pressure for different values of relative humidity. If this fails to maintain the space temperature below a predetermined high value, then thermostat 125 will cause tilting of mercury switch 110 to its opposite position for operating the engine at high speed irrespective of the prevailing relative humidity.

During relatively cool and damp weather, the humidity controller will operate the system for performing the necessary amount of dehumidification even though no sensible cooling is necessary. At such times the humidity controller 126 will position step controller 100 for maintaining mercury switch 89 closed even though the space temperature is relatively low. In other words, the potentiometer formed of sliders 142 and 143 of the humidity controller 126 will cause positioning of the step controller 100 for operating the engine 13, and the potentiometer formed of slider 147 and resistance 148 will position the proportioning motor 80 for maintaining a relatively low suction pressure within the system. This operation of the system for performing dehumidification will cause the space temperature to fall below the setting of the thermostat 220 as determined by the outside thermostat 127, which will cause energization of the relay 255 for opening solenoid valve 28. This will permit flow of liquid refrigerant from the condenser coil 7, thus permitting compressed refrigerant to enter coil 7 for condensing and reheating the air which has been cooled and dehumidified by the coil 6. The solenoid valve 28 will allow refrigerant to flow from condenser 7 at only a relatively low rate. Due to the heating action of the condenser 7, the space temperature will begin to rise, which will eventually cause operation of the relay 255 for closing valve 28. This will occur before coil 7 is completely drained of liquid refrigerant. It will be apparent that the longer the period of time required for restoring of the space temperature to a value which causes valve 28 to close, the greater the portion of coil 7 is exposed to gaseous refrigerant. Thus if the demand for reheat is light the space temperature will rise to a value for closing valve 28 within a relatively short time which places only a small portion of condenser 7 into operation, while if the reheating load is heavier a larger portion of coil 7 will be placed into operation. In this manner the level of liquid refrigerant in condenser coil 7 varies with the reheating load. Due to the thermostat 220 which controls the valve 28 being adjusted by outdoor thermostat 127, this thermostat will place the reheater or condenser 7 into operation at different values of inside temperature for varying values of outside temperature. In other words, if outside temperature is relatively high the condenser 7 will be placed into operation for reheating the air to maintain a higher space temperature than would be maintained if outside temperature were lower. If the cooling load on the system decreases due to decrease in outside temperature and humidity, the effective temperature within the space will fall below the settings of thermostat 125 and humidity controller 126 as determined by the outdoor thermostat 127. This will cause rotation of shaft 102 of step controller 100 in a counter-clockwise direction for tilting the mercury switch 89 to open position which stops the engine 13. Thus when the effective temperature within the space falls below the value determined by the outside thermostat 127 and neither the space temperature nor humidity is excessive, the engine is stopped for preventing further cooling action. The system therefore provides for maintaining proper space relative humidity, and for varying the space temperature maintained in accordance with outside temperature, irrespective of whether cooling or reheating is required for maintaining the proper space temperature for the prevailing outside temperature.

As the heating season approaches, the space temperature will fall to 70° F. which will cause the thermostat 125 to tilt mercury switch 137 for bridging its left-hand electrodes. This will cause the shaft 102 of step controller 100 to rotate to its extreme counter-clockwise limit of rotation. For this new position of shaft 102 the raised portion of cam 103 will again engage the cam follower 109 for tilting mercury switch 89 to closed position for starting engine 13. Also the raised portion 112 of cam 104 will engage the cam follower for tilting mercury switch 110 in a manner to bridge its left-hand electrodes. This will cause the proportioning motor 80 to operate engine 13 at high speed. The mercury switches 113 and 114 will also be tilted for bridging their left-hand electrodes at this time and this will cause closure of the motorized valve 20 at the inlet of condenser 21 and will also cause positioning of three-way valve 51 in a manner to permit flow of heating medium through the coil 8 in conditioning chamber 1. Due to the space temperature being at 70° F. the thermostat 220 will have the valve 28 opened. With valve 20 closed the flow of refrigerant will now be from compressor 12 through pipe 18 into the condenser 7 and from this condenser through pump 31 into the auxiliary evaporator 33, wherein a portion is re-evaporated and returned to condenser 7 while the unevaporated portion passes into the outside evaporator 41 and then to the compressor. The system will therefore operate on the heating cycle for heating the space. Due to valve 20 now being closed, the refrigerant pressure within summer condenser 21 will fall to a minimum, which will cause the valve 23 to stop the flow of cooling water through this device. Due to the positioning of three-way valve 57 for permitting flow of heated water through the heating coils 8 and 10, all of the heat received from the engine and from the auxiliary condenser 46 which is not necessary for maintaining the domestic water supply will be supplied to these coils 8 and 10 and thus transferred to the space being heated. This action will also provide for maintaining the engine cool during the heating cycle. From the foregoing it should be apparent that when the space temperature falls to 70° F. the system will operate on the heating cycle and the engine will operate at full speed. This action will continue until the space temperature rises above the low limit setting of thermostat 125, which will cause the engine to stop. The engine will thus be placed into and out of operation in a manner to maintain substantially a constant space temperature during the heating season.

During relatively mild weather the system may not be operating sufficiently to maintain the domestic water sufficiently hot even though thermostat 60 has valve 54 positioned for supplying all the hot water to tank 55. In such event, the thermostat 280 will cause operation of the engine at full speed for heating the domestic hot water. During such weather the solenoid valve 28 will be closed due to the space temperature being above the setting of thermostat 220. Also at such time the heating coil 8 will not be in operation due to three-way valve 54 being positioned for supplying all of the heating water to tank 55. Consequently, operation of the engine for heating domestic water only will not supply any heat to the space being conditioned and thus the space will not be overheated by operation of the engine under the control of the domestic water thermostat 280. In the event that the domestic hot water becomes too cool when the system is operating on the cooling cycle, then thermostat 280 will again cause the engine to operate at full speed. This will not over-cool the space, however, for if the space temperature begins falling too low due to operation of the engine at full speed, the condenser 7 will be placed into operation for supplying enough heat to the space to avoid overcooling.

In the event that the demand for domestic hot water is more than can be supplied by the engine even when operating at full speed, the thermostatic gas valve 300 will open for supplying gas to the burner 301 located under tank 55, thereby providing supplemental heat for heating the domestic hot water.

During severe cold weather the evaporator 41 may not pick up sufficient heat from outside to maintain the space temperature at the desired value even though engine 13 operates continuously. In such event, the space temperature will fall below the setting of the thermostat 302 which may be set at 68° F. This thermostat controls a gas valve 303 which controls the supply of gas to burner 304 which is located within the auxiliary evaporator 33. When the temperature of the return air falls below the setting of thermostat 302 the valve 303 will open for placing the burner 304 in operation. This will provide additional heat for heating the space, this heat being transferred to the space by the condenser 7.

From the foregoing description it should be apparent that this invention provides a complete summer-winter air conditioning system which operates to cool and dehumidify the space in summer, to heat the space in winter, and to provide a supply of domestic hot water at all times. It should also be apparent that this invention provides for utilizing an internal combustion engine for operating the system and for utilizing the waste heat from this engine for providing the domestic hot water supply. While I have shown and described a preferred form of my invention, it will be apparent that many modifications and adaptations of my invention will occur to those skilled in the art. Also, while the various control instrumentalities cooperate in providing a complete automatic system, it will be apparent that certain features also have utility apart from the complete system. I therefore desire to be limited only by the scope of the appended claims.

I claim as my invention:

1. In an air conditioning system, in combination, cooling and dehumidifying means for cooling and dehumidifying the air in a space being conditioned including variable capacity compressor means, means influenced by the temperature and humidity of said space for placing said cooling and dehumidifying means in operation when the effective temperature within the space becomes excessive, means influenced by the relative humidity in said space for controlling the capacity of said compressor means when said cooling and dehumidifying means is in operation, and means for placing said cooling and dehumidifying means into operation when the space relative humidity becomes excessive.

2. In an air conditioning system, in combination, cooling and dehumidifying means for cooling and dehumidifying the air in a space being conditioned including variable capacity compressor means, means influenced by the temperature and humidity of said space for placing said cooling and dehumidifying means in operation when the effective temperature within the space becomes excessive, means influenced by the relative humidity in said space for controlling the capacity of said compressor means when said cooling and dehumidifying means is in operation, and means for placing said cooling and dehumidifying means into operation when the space temperature becomes excessive, irrespective of the value of effective temperature within said space.

3. In an air conditioning system, in combination, cooling and dehumidifying means for cooling and dehumidifying the air in a space to be conditioned, a reheater for reheating the air, space temperature and humidity responsive means for placing said cooling and dehumidifying means into operation when space temperature or relative humidity becomes excessive, means influenced by relative humidity for controlling the action of said cooling and dehumidifying means when in operation, thermostatic means for controlling said reheater, and means influenced by outside temperature for adjusting said temperature and humidity responsive means and said thermostatic means in accordance with variations in outside temperature.

4. In an air conditioning system, in combination, a cooling coil in heat exchange relationship with a space being conditioned, said coil forming a part of refrigeration system including a compressor, an internal combustion engine for driving said compressor, means for varying the speed of said engine, an adjustable speed controller responsive to the speed of said internal combustion engine controlling said speed varying means to maintain the engine speed constant for any given adjustment of said speed controller, starting and stopping circuit means for said internal combustion engine, control means for controlling said starting and stopping circuit means, motor means for adjusting said speed controller in response to variations in pressure within said cooling coil, for varying the speed of said engine in a manner tending to maintain said pressure constant, a second motor means for adjusting said first motor means, control means for controlling said second motor means, and means responsive to the psychrometric condition of the air in said space for operating both of said control means.

5. In a system of the class described, in combination, a cooling coil forming a part of a refrigeration system including a compressor, a prime mover for driving said compressor, an adjustable speed governor for said prime mover for maintaining the speed thereof constant for any given adjustment of said speed governor, motor means for adjusting said speed governor in response to variations in rate of refrigerant evaporation within said cooling coil, a second motor means for adjusting said first motor means, and means for controlling said second motor means responsive to the demand for refrigeration in said space.

6. In a combined heating and cooling system, in combination, a reversible cycle refrigeration system including heat exchangers in heat exchange relationship with said space and with a medium external to said space, a compressor connected to said heat exchangers, changeover valve means associated with said heat exchangers for selectively conditioning said system for heating or cooling the space, an internal combustion engine for driving said compressor, starting and stopping circuit means for said engine, a first switching means for controlling said starting and stopping circuit means, a second switching means for actuating said changeover valve means, a first motor means for actuating said first and second switching means, a speed controller for said internal combustion engine, a second motor means for actuating said speed controller, and condition responsive means responsive to the demand for heating or cooling for controlling said first motor means, and responsive to the load on the system for controlling said second motor means, and switching means actuated by said first motor means for additionally controlling said second motor means.

7. In a control system, in combination, a plurality of control devices, reversible motor means having a range of movement for actuating one of said control devices in a first portion of its range of movement and for actuating another of said control devices in a second portion of its range of movement, a plurality of controllers cooperating in controlling said motor means for causing said motor means to assume a position in accordance with the resultant of the action of said plurality of controllers, means for preventing said motor means from moving into said first portion of its range of movement, and a controller for rendering said preventing means inactive.

8. In a control system, in combination, a plurality of control devices, reversible electric motor means having a range of movement for actuating one of said control devices in a first portion of its range of movement and for actuating another of said control devices in a second portion of its range of movement, a variable resistance type controller for controlling the position assumed by said motor means, a resistance connected in circuit with said motor means in a manner to prevent said motor means from moving into one portion of said range of movement, and a controller for placing said resistance into and out of circuit with said motor means.

9. In a combined heating and cooling system, in combination, a reversible cycle refrigeration system including a winter condenser and a summer evaporator in heat exchange relationship with a space to be conditioned, a summer condenser and a winter evaporator in heat exchange relationship with medium other than in said space, a compressor, a first valve means for directing the flow of refrigerant from said compressor through said summer condenser and summer evaporator back to said compressor, a second valve means for directing the flow of refrigerant from said compressor through said winter condenser and winter evaporator and back to said compressor, an internal combustion engine for driving said compressor, starting and stopping circuit means for said engine, switching means for controlling said starting and stopping circuit means, switching means for controlling said second valve means, motor means for actuating said switching means, space temperature responsive means for controlling said motor means, space temperature responsive means for controlling said first valve means, and outside temperature responsive means for adjusting both of said temperature responsive means.

10. In a combined heating and cooling system, in combination, a reversible cycle refrigeration system including a winter condenser and a summer evaporator in heat exchange relationship with a space to be conditioned, a summer condenser and a winter evaporator in heat exchange relationship with medium other than in said space, a compressor, a first valve means for directing the flow of refrigerant from said compressor through said summer condenser and summer evaporator back to said compressor, a second valve means for directing the flow of refrigerant from said compressor through said winter condenser and winter evaporator and back to said compressor, first space temperature influenced means for controlling said first valve means, second space temperature influenced means for controlling said second valve means, and outside temperature influenced means for adjusting said first and second space temperature influenced means.

11. In a combined heating and cooling system, in combination, a reversible cycle refrigeration system including a winter condenser and a summer evaporator in heat exchange relationship with a space to be conditioned, a summer condenser and a winter evaporator in heat exchange relationship with medium other than in said space, a compressor, a first valve means for directing the flow of refrigerant from said compressor through said summer condenser and summer evaporator back to said compressor, a second valve means for directing the flow of refrigerant from said compressor through said winter condenser and winter evaporator and back to said compressor, first space temperature influenced means for controlling said first valve means, and second space temperature influenced means for controlling said second valve means.

12. In a combined heating and cooling system, in combination, a reversible cycle refrigeration system including a winter condenser and a summer evaporator in heat exchange relationship with a space to be conditioned, a summer condenser and a winter evaporator in heat exchange relationship with medium other than in said space, a compressor, a first valve means for directing the flow of refrigerant from said compressor through said summer condenser and summer evaporator back to said compressor, a second valve means for directing the flow of refrigerant from said compressor through said winter condenser and winter evaporator and back to said compressor, and independent means for controlling said first and second valve means, said independent means responding to the demand for change in heat content of the air in said space.

13. In a combined heating and cooling system, in combination, a reversible cycle refrigeration system including a winter condenser and a summer evaporator in heat exchange relationship with a space to be conditioned, a summer condenser and a winter evaporator in heat exchange relationship with medium other than in said space, a compressor, a first valve means for directing the flow of refrigerant from said compressor through said summer condenser and summer evaporator back to said compressor, a second valve means for directing the flow of refrigerant from said compressor through said winter condenser and winter evaporator and back to said compressor, and condition responsive means responsive to temperature and humidity for controlling said first and second valve means, said condition responsive means being operative to open said first valve means when cooling is desired, to open said second valve means when heating is desired, and to open both of said valve means for providing dehumidification and reheat when dehumidification is desired.

14. In a heating system of the class described, in combination, a condenser in heat exchange relationship with a space to be heated, an evaporator for absorbing heat from outside of said space, a compressor connected to said condenser and said evaporator, an internal combustion engine for driving said compressor, a second condenser receiving compressed refrigerant from said compressor for heating a fluid which in turn heats said space, and means for passing refrigerant condensed in said second condenser in heat exchange relationship with said engine for reevaporating said refrigerant.

15. In a heating system of the class described, in combination, a condenser in heat exchange relationship with a space to be heated, an evaporator for absorbing heat from outside of said space, a compressor connected to said condenser and said evaporator, an internal combustion engine for driving said compressor, a second condenser receiving compressed refrigerant from said compressor for heating a fluid to be heated, means for passing said fluid to be heated serially in heat exchange relationship with said second condenser and with said engine, a heat exchanger heated by exhaust gases from said engine, means for passing said fluid through said heat exchanger, by-pass means for said fluid around said heat exchanger, means responsive to the temperature of said fluid for controlling said by-pass, a storage tank for said medium, means for passing said medium into said storage tank, by-pass means for said fluid around said storage tank, means responsive to the temperature of the stored medium for controlling said storage tank by-pass, a space heat exchanger for heating said space, means for passing said medium into said space heat exchanger, a by-pass for said medium around said space heat exchanger, and means responsive to space temperature for controlling said last mentioned by-pass.

16. In an air conditioning system for a space, in combination, an evaporator in heat exchange relationship with the space, said evaporator forming a part of a refrigeration system having variable capacity compressor means, a first controller placing said compressor means into operation, a second controller for varying the capacity of said compressor means, said second controller being incapable of placing said compressor means in operation, a third controller for increasing the capacity of said compressor means independently of said second controller, and means responsive to temperature and humidity in said space for sequentially controlling said first and third controllers in a manner to place said compressor means into operation when space temperature rises to an intermediate value while the humidity is intermediate, to cause the compressor means to operate at high capacity when space temperature rises to a high value irrespective of humidity, to place said compressor means in operation when the space humidity becomes excessive and to vary the capacity of said compressor means in accordance with the changes in relative humidity.

17. In an air conditioning system for a space, in combination, an evaporator in heat exchange relationship with the space, said evaporator forming part of a refrigeration system having variable capacity compressor means, capacity control means for varying the capacity of said compressor means, a first motor for operating said capacity control means, means responsive to the humidity in said space for controlling said first motor for thereby varying the capacity of the compressor means in accordance with humidity, a first controller for placing said compressor means into operation, a second controller for controlling said first motor conjointly with said humidity responsive means for increasing the capacity of said compressor means independently of humidity, a second motor for controlling said first and second controllers in sequence, and thermostatic means responsive to the temperature in said space for controlling said second motor.

18. In an air conditioning system for a space, in combination, an evaporator in heat exchange relationship with the space, said evaporator forming part of a refrigeration system having variable capacity compressor means, capacity control means for varying the capacity of said compressor means, a first motor for operating said capacity control means, a first controller for controlling said first motor, a second controller for placing said compressor means into operation, a third controller for controlling said first motor conjointly with the first controller for increasing the capacity of the compressor means independently of said first controller, a second motor for sequentially controlling said second and third controllers in a manner to first place said compressor means into operation at a capacity determined by said first controller and then cause operation of said compressor means at high capacity independently of said first controller, space temperature responsive means, space humidity responsive means, one of said responsive means controlling said first controller and the other of said responsive means controlling said second motor.

19. In an air conditioning system for a space, in combination, an evaporator in heat exchange relationship with the space, said evaporator forming part of a refrigeration system having variable capacity compressor means, capacity control means for varying the capacity of said compressor means, a first motor for operating said capacity control means, means responsive to the humidity in said space for controlling said first motor for thereby varying the capacity of the compressor means in accordance with humidity, a first controller for placing said compressor means into operation, a second controller for controlling said first motor conjointly with said humidity responsive means for increasing the capacity of said compressor means independently of humidity, a second motor for controlling said first and second controllers in sequence, thermostatic means responsive to the temperature in said space for controlling said second motor, and means responsive to outside temperature for adjusting the control point of said thermostatic means in accordance with outside temperature.

20. In an air conditioning system for a space, in combination, an evaporator in heat exchange relationship with the space, said evaporator forming part of a refrigeration system having variable capacity compressor means, capacity control means for varying the capacity of said compressor means, a first motor for operating said capacity control means, means responsive to the humidity in said space, means actuated by said humidity responsive means for controlling said first motor for thereby varying the capacity of the compressor means in accordance with humidity, a first controller for placing said compressor means into operation, a second controller for controlling said first motor conjointly with said last-named means for increasing the capacity of said compressor means independently of humidity, a second motor for controlling said first and second controllers in sequence, thermostatic means responsive to the temperature in said space for controlling said second motor, and control means actuated by the humidity responsive means for controlling said second motor conjointly with said thermostatic means in a manner to place the compressor means into operation when the humidity in the space becomes excessive.

21. In an air conditioning system for a space, in combination, an evaporator in heat exchange relationship with the space, said evaporator forming part of a refrigeration system having variable capacity compressor means, capacity control means for varying the capacity of said compressor means, a first motor for operating said capacity control means, means responsive to the humidity in said space, means actuated by said humidity responsive means for controlling said first motor for thereby varying the capacity of the compressor means in accordance with humidity, a first controller for placing said compressor means into operation, a second controller for controlling said first motor conjointly with said last-named means for increasing the capacity of said compressor means independently of humidity, a second motor for controlling said first and second controllers in sequence, thermostatic means responsive to the temperature in said space for controlling said second motor, and control means actuated by said humidity responsive means for cooperating with said thermostatic means in controlling said second motor to vary the temperature maintained by said thermostatic means to maintain a constant effective temperature and to cause said second motor to operate for placing said compressor means into operation when the relative humidity becomes excessive.

22. In an air conditioning system, in combination, cooling and dehumidifying means for cooling and dehumidifying the air in a space being conditioned, said cooling and dehumidifying means including a compressor, an internal combustion engine for driving said compressor, starting and stopping circuit means for said engine, switching means for controlling said circuit means, first motor means for actuating said switching means, a thermostat for controlling said first motor means in a manner to place said engine into operation upon rise in temperature to a predetermined value, a speed controller for said engine, second motor means for variably adjusting said speed controller in a manner to vary the speed of said engine, and means responsive to the humidity in said space for variably positioning said second motor means to vary the speed of said engine upon changes in humidity and for controlling said first motor means in a manner to place said engine into operation upon rise in humidity and independently of said thermostat.

23. In an air conditioning system, in combination, cooling and dehumidifying means for cooling and dehumidifying the air in a space being conditioned, said cooling and dehumidifying means including a compressor, an internal combustion engine for driving said compressor, starting and stopping circuit means for said engine, switching means for controlling said circuit means, first motor means for actuating said switching means, a thermostat for controllnig said first motor means in a manner to place said engine into operation upon rise in temperature to a predetermined value, a speed controller for said engine, second motor means for operating said speed controller to vary the speed of said engine, means responsive to the humidity in said space for normally controlling said second motor means to cause variation in engine speed upon changes in humidity, and means actuated by said first motor means for controlling said second motor means conjointly with the humidity responsive means in a manner to cause the engine to operate at high speed independently of the humidity responsive means when the temperature rises to a predetermined value.

24. In an air conditioning system, in combination, cooling and dehumidifying means for cooling and dehumidifying the air in a space being conditioned, said cooling and dehumidifying means including a compressor, an internal combustion engine for driving said compressor, starting and stopping circuit means for said engine, switching means for controlling said circuit means, first motor means for actuating said switching means, a thermostat for controlling said first motor means in a manner to place said engine into operation upon rise in temperature to a predetermined value, a speed controller for said engine, second motor means for operating said speed controller, a humidity controller for controlling said first motor means in a manner to place said engine into operation upon rise in humidity and independently of said thermostat and for normally controlling said second motor means to vary the speed of said engines upon changes in humidity, and means actuated by said first motor means for controlling said second motor means conjointly with the humidity responsive means in a manner to cause the engine to operate at high speed independently of said humidity responsive means when the temperature rises to a predetermined value.

25. In an air conditioning system, in combination, cooling and dehumidifying means for cooling and dehumidifying the air in a space to be conditioned, a reheater for reheating the air, space temperature responsive means for placing said cooling and dehumidifying means into operation when space temperature becomes excessive, means influenced by relative humidity for controlling the action of said cooling and dehumidifying means when in operation, thermostatic means for controlling said reheater, and means influenced by outside temperature for adjusting said temperature responsive means and said thermostatic means in accordance with variations in outside temperature.

26. In a combined heating and cooling system, in combination, a reversible cycle refrigeration system including heat exchangers in heat exchange relationship with said space and with a medium external to said space, a compressor connected to said heat exchangers, changeover valve means associated with said heat exchangers for selectively conditioning said system for heating or cooling the space, first switching means for controlling said compressor, second switching means for controlling said changeover valve means, motor means having a range of movement for actuating said first switching means in a first portion of said range of movement and for actuating said second switching means in a second portion of said range of movement, control mechanism for moving said motor means through the first portion of its range of movement for causing operation of said first switching means without operating the second switching means, control mechanism for moving said motor means through the second portion of its range of movement for operating said second switching means to reverse operation of the system, and means responsive to the heating and cooling load on the system for operating said control mechanisms.

ALWIN B. NEWTON.